March 30, 1965    R. E. SCHMIDT ETAL    3,175,723
WIRING SYSTEM JUNCTION BOX
Filed Aug. 16, 1962    3 Sheets-Sheet 1
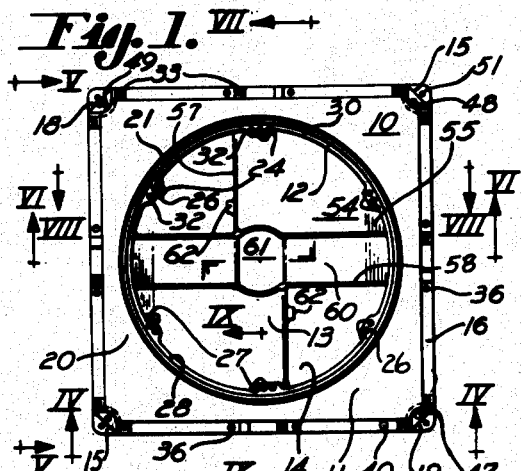
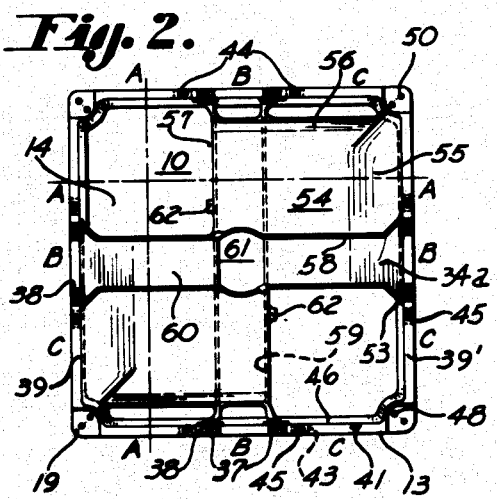
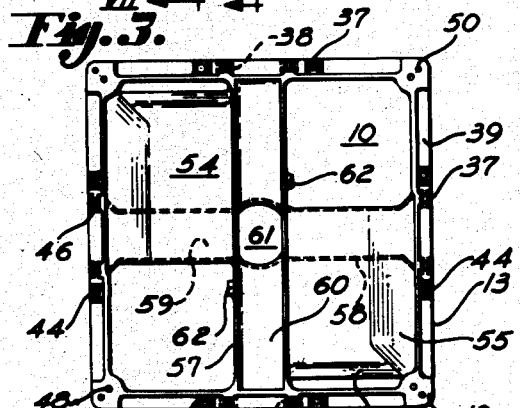
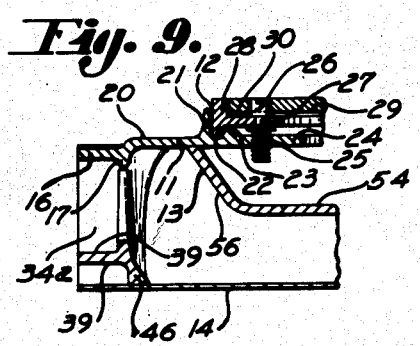
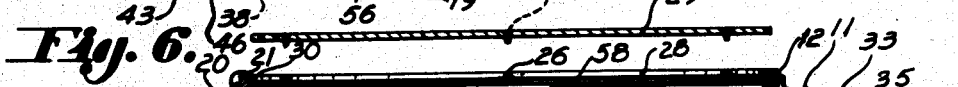
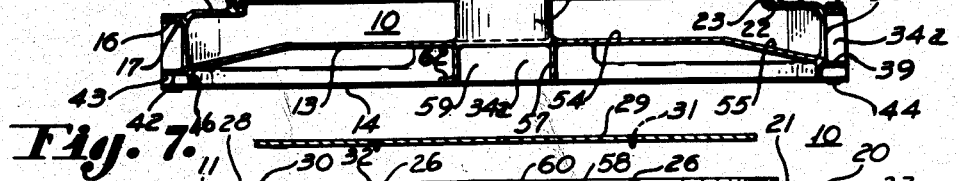
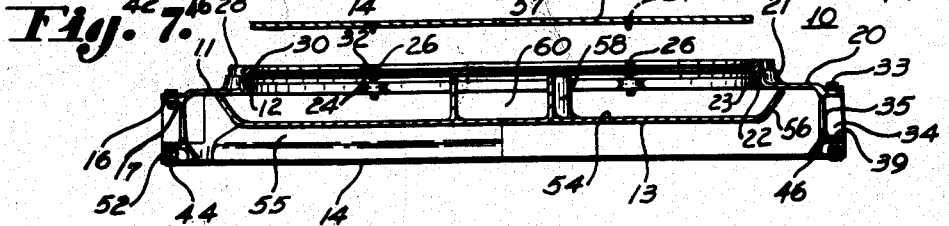
INVENTORS
ROBERT E. SCHMIDT &
MICHAEL GUZAN, JR.
by Hoopes, Leonard & Buell
their attorneys

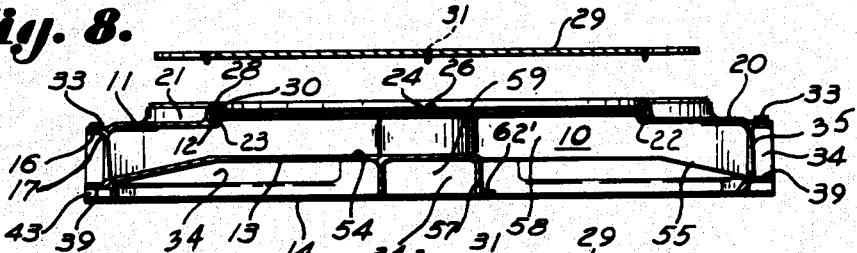
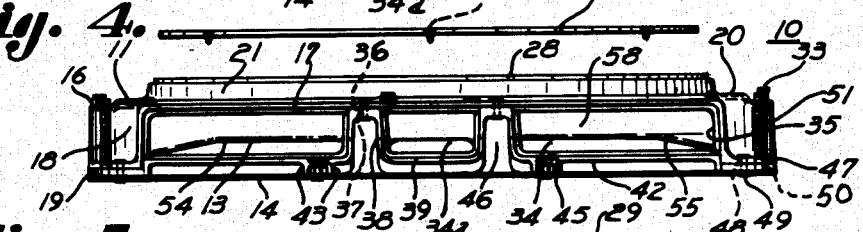
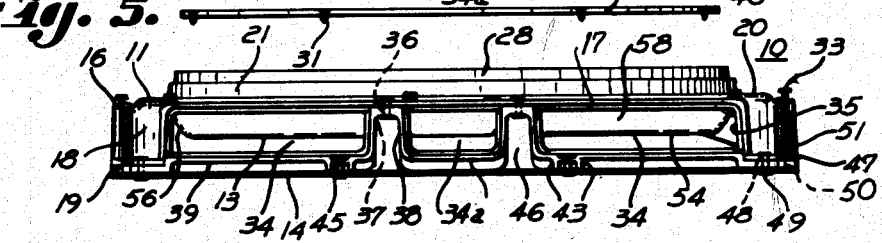
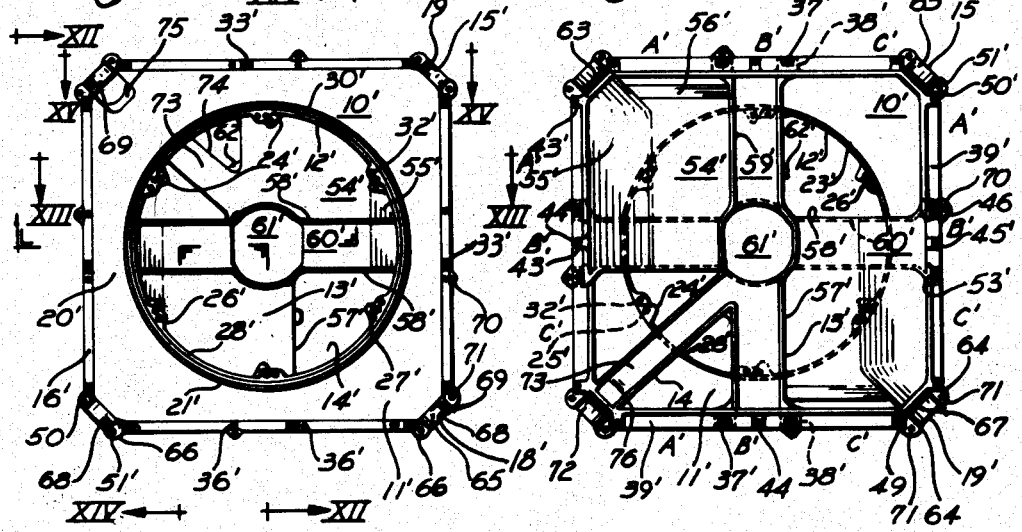

INVENTORS
ROBERT E. SCHMIDT &
MICHAEL GUZAN, JR.
by Hoopes, Leonard & Buell
their attorneys

United States Patent Office 3,175,723
Patented Mar. 30, 1965

3,175,723
WIRING SYSTEM JUNCTION BOX
Robert E. Schmidt, East Rochester, and Michael Guzan, Jr., Ambridge, Pa., assignors to H. K. Porter Company, Inc., Pittsburgh, Pa., a corporation of Delaware
Filed Aug. 16, 1962, Ser. No. 217,437
9 Claims. (Cl. 220—3.7)

This invention relates to a junction box or the like connectible to duct or conduit runs in a floor or other distribution wiring system. More particularly, this invention pertains to a relatively lightweight construction of such a junction box or the like comprising top, partition-frame and bottom elements which can be more readily and inexpensively fabricated and assembled, and provide full openings and passages for wires.

In floor distribution wiring systems for buildings and other structures, it is advantageous to use junction boxes at intersections of underfloor raceways and duct runs. They normally are put in place prior to the completion of the floor and usually are embedded in concrete used either as underflooring or finish flooring, as desired. Many advantages inure to the use of junction boxes of the present invention in such a distribution system. For example, junction boxes of this invention dispense with any cast metal bottom and utilize instead a flat metal sheet preferably made of steel. A cast intermediate member is provided with integral partition and frame portions for greater rigidity and protection at the periphery of the box where connection is to be made to the ducts and/or conduits terminating thereat, the frame portion further acting to keep ducts and conduits from pressing directly on the sheet metal plate used as the bottom member. And, in a cast top member for junction boxes of this construction, downwardly extending peripheral corner post portions cooperate with the rim of the intermediate frame member, while upstanding post portions on the frame between the corners cooperate with the rim of the top casting, for ready assembly therewith preferably by riveting through registering holes therethrough respectively. Access to the interior of the box is obtainable through a cover plate which cooperates with an adjustable height ring movable within a cylindrical flange integral with the top casting, the adjustable height ring preferably embodying a construction under United States Letters Patent No. 3,025,884. Preferably, walls partitioning compartments and passages in the intermediate member are affixed to the bottom member inwardly of the edges thereof to inhibit separation of the bottom frame from adjoining bottom edges of such partitioning walls, the edge of such bottom further being fastened to the lower rim of the frame preferably by riveting.

Other objects, features and advantages of this invention will be apparent from the following description and the accompanying drawings, which are illustrative only, in which FIGURE 1 is a plan view of a three-duct junction box embodiment of this invention with the cover plate removed;

FIGURE 2 is a plan view of the box shown in FIGURE 1, with the entire top member removed;

FIGURE 3 is a bottom view of the partition-frame member in the embodiment of FIGURE 1 with the bottom member removed therefrom;

FIGURE 4 is a side view taken in the direction of line IV—IV of FIGURE 1 with the cover plate positioned above the access opening therein and the adjusting ring in a lowered position;

FIGURE 5 is a side view of the embodiment shown in FIGURE 1 taken in the direction of line V—V thereon with the top cover plate lifted and the adjusting ring in a raised position;

FIGURE 6 is a view in section taken along line VI—VI of FIGURE 1;

FIGURE 7 is a view in section taken along line VII—VII of FIGURE 1;

FIGURE 8 is a view in section taken along line VIII—VIII of FIGURE 1;

FIGURE 9 is a detail view in section taken along line IX—IX of FIGURE 1;

FIGURE 10 is a plan view of another three-duct embodiment of this invention having corner conduit outlets, with the cover removed.

FIGURE 11 is a bottom view of the embodiment shown in FIGURE 10 with the bottom member removed;

Figure 12:
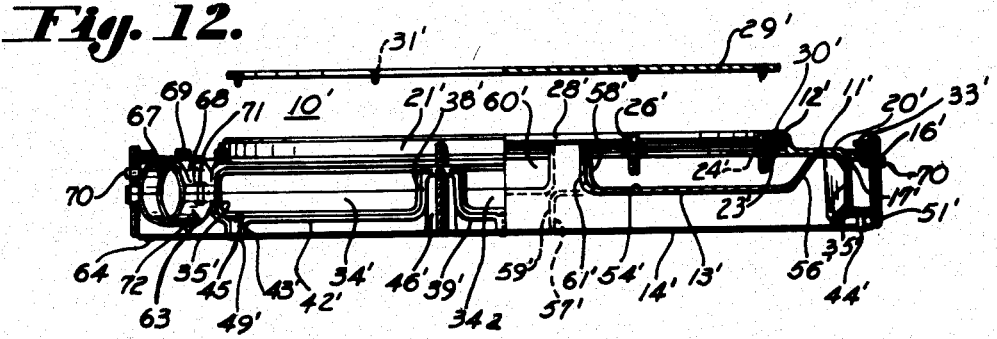
FIGURE 12 is a view partly in elevation and partly in section taken along line XII—XII of FIGURE 10.

Referring to FIGURES 1 to 9 of the drawings, there is illustrated therein a three-duct junction box embodiment 10 of this invention in which there are no corner openings for conduits. Box 10 comprises a one-piece cast top 11 which is rectangular in plan and provided with a circular access opening 12, a cast intermediate partition and frame member 13 and a sheet metal bottom 14, which may be made of steel plate. The tips of the respective corners of top 11 terminate on a diagonal in plan as represented by the line 15 and the tips of bottom 14 are similarly truncated substantially in the same vertical plane as each line 15. Top 11 is bounded by an integral upper rim 16 in horizontal flange form with a downwardly facing horizontal bead 17 on the inside of flange 16 between integral corner posts 18. Posts 18 extend downwardly for a distance equal to the height of said box at its peripheral edge, the bottoms of the corner posts 18 resting on the upper surface of the corners 19 of frame-partition member 13. The surface 20 of top 11 extends inwardly from its rim to access opening 12 and is provided with an upstanding integral circular flange 21 around said opening and spaced a small distance radially outwardly therefrom to provide an annular groove 22 for an inner cylindrical edge 23 considerably shorter than flange 21.

At circumferentially spaced points around opening 12 there are inwardly projecting ears 24 provided with threaded vertical holes 25 therethrough to engage captive machine screws 26 held in slots 27 on an adjustable height ring 28. The head of each screw 26 preferably extends through an opening in a cover plate 29 so that the height of ring 28 may be adjusted in telescoping relation to and inwardly of flange 21 without removing cover 29. A circular gasket 30 normally may be provided between cover 29 and a circular internal shoulder on ring 28, cover 29 being fastenable to ring 28 by countersunk screws 31 engaging threaded openings 32 in the inward projection on ring 28 containing the slots 27. The adjustment ring cover plate subassembly and cooperation just described is set forth with more particularity in United States Letters Patent No. 3,025,884, the disclosure of which is incorporated herein by reference. Hence, in use the over-all height of junction box 10 can be varied depending upon the amount of the telescoping of ring 28 relative to flange 21 to suit any variation in flooring thickness in which a junction box 10 may be used. Further, as will be understood, different types of cover plates may be used with such junction box and any may make further provision for flush matching closure in the event that the finish flooring is linoleum, terrazzo or other special surfacing material.

Upper rim 16 is provided with a plurality of drilled holes for set screws 33 to engage duct ends which are inserted in respective duct openings 34 usually until a duct end abuts bead 17 which acts as a stop. Each such stop is continued around the inner edge of each duct opening by beads 35 extending vertically downwardly along the sides of each corner post 18 and by registering beads on partition-frame 13. Additionally, holes 36 are provided through upper rim 16 for registry with holes 37 in the horizontal reach of upwardly extending inverted U-shaped posts 38. Posts 38 are an upstanding integral part of lower rim 39 of frame member 13. Hence, the respective top (except for its cover and adjusting ring elements) and middle members 11 and 13 of the box 10 comprise strength castings, which may be conveniently, inexpensively and permanently fastened together by rivets, although other fasteners or means of uniting the respective parts may be used. Preferably, index marks 40 and 41 are used for orientation of the respective parts at the time that the completed box 10 is made and, also, when it is installed.

Member 13 is rectangular in plane and with corners 19 which are not truncated at the tips, as may be seen in FIGURES 2 and 3. Integral corners 19 are joined by a lower rim 39 along each side, the lower rim being raised somewhat above the bottom of corners 19 and bottom 14. Downwardly extending integral feet 43 are provided for rim 39, the undersides of such corners 19 and of such feet substantially being in the plane of the upper surface of sheet metal bottom member 14. Lower rim 39 between respective pairs of feet 43 is drilled in registry with a hole in bottom 14 for rivets 44, the lower end of which rivets are made flush or countersunk so as to not extend significantly below the underside of bottom 14, whereas the heads of those rivets are wholly within recesses 45 in the upper surface of lower rim 39 so that those rivets do not project into the respective duct openings 34. The upstanding posts 38 extend for substantially the full height of the peripheral edge of box 10. The back of the space beneath rim 39 is closed by an integral skirt 46, an upward extension of which closes the back of each post 38, to maintain the enclosure integrity of box 10 after it is positioned in a flooring space and the ducts connected thereto, before the concrete slab in which box 10 and the wiring system are usually embedded, is poured, the depth of such pouring usually covering box 10 up to just about the top of ring 28. The lower edge of such peripheral skirt 46 extends substantially to the plane of the upper surface of bottom 14.

Each corner post 18 is L-shaped in vertical radial section and the foot 47 thereof fits in a slight depression in corner 19 on top of the lower rim portion of partition-frame 13. A hole 48 extends in registry through foot 47, corner 19 and bottom 14 for affixation together by rivets 49 the lower end of which is countersunk or flush with the underside of bottom 14 to complete the assembly uniting the respective parts of box 10. Radially outwardly of the openings 48 are threaded vertical openings 50 which are also outwardly of the corner edge of bottom 14 and foot 47, the threaded opening 50 being in corners 19 only to receive threaded adjustment studs 51 which are screwed down a selected height below the bottom of box 10 when box 10 is put in position, on the form, underslab, or beam, on which the flooring proper is to be laid. Thereby, box 10 is adjusted to the proper height to receive duct ends and with them preferably will be within the strength slab itself as in the case of a concrete sub-floor or floor, box 10 having strength enough to become a composite part of such sub-flooring or floor, with access thereto and to the duct and/or conduits connected therewith through the interior of the box when cover 29 is removed. It will be noted, moreover, that all of the surrounds of each duct opening 34 are cast metal such as cast iron or cast steel so that the duct ends connected to box 10 do not rest directly on bottom 14 but upon the normally rigid cast metal, the feet 43, and any spacers 52 or rivets 44 beneath rim 39 that may be used therewith, and corners 19 providing for substantially even distribution of stress around the whole edge of box 10.

In the illustrated embodiment, the corner posts 18 of top 11 and the inner posts 38 of frame 13 define the sides of the respective duct openings 34, a central opening 34a on each side being smaller in the illustrated embodiment, although any relation of sizes may be utilized in the same way that a two-duct junction box or the like of this invention may be provided in which there is only one post 38 on each side, corresponding rearrangements of the interior passages being provided in such case as will readily be understood. And, the vertical distance between the upper and lower rims 16 and 39 determines the height of the duct openings, the peripheral beads 17 fitting in grooves 53 on the inside of the top of the respective posts 38. In general, the peripheral dimensions of duct openings 34 correspond to one of the standard sizes of ducts used in floor distribution wiring systems.

Partition-frame member 13 is an integral casting including the lower rim 39, posts 38 and corner portions 19 described above as a part of the peripheral frame. In addition, member 13 comprises generally horizontal partitions 54 at a level generally intermediate the top and bottom of box 10, such partitions having downwardly inclined marginal portions 55 extending substantially to lower rim 39 and upwardly inclined margins 56 extending substantially to the vicinity of upper rim 16, the slope of margins 56 being more abrupt to serve as outer side walls and provide greater passage capacity on top of the respective portions of the horizontal partitions 54. Downwardly extending interior walls 57 and upwardly extending interior walls 58 extend from horizontal partition 54 at right angles to provide a smaller, lower cross passage 59 and a smaller, upper cross passage 60 between such interior walls and at right angles to one another, the cross passages communicating with each other through a central opening 61 in partition 54. Such partition 54 in the illustrated embodiment is shown in FIGURE 2 in what may be indicated as the northeast and southwest quadrants thereof. In the northwest and southeast quadrants of that embodiment, the height of the interior of box 10 is unobstructed between the upper surface of bottom 14 and the underside of top 11. Side walls 57 are provided with integral angle brackets 62 in the central area of box 10 for affixation, by adhesive or otherwise, to sheet metal bottom 14 to further insure against movement thereof away from the bottom edges of, for example, the walls 57 thereby insuring the separation of the respective passages and preventing wires from being past or caught beneath such bottom edges. All of the walls of partition-frame 13 including marginal portions 55, extend at their free edge substantially close to the top or bottom, as the case may be, box 10 to provide assured physical separation of the respective passages separated thereby and wires using the respective sets of passages leading to respective sets of ducts and/or other inlet or outlet that may be desired including access opening 12. When there is an outlet fitting means to be located above opening 12, there will be an outlet adapter cover utilized in place of cover 29. In the embodiment being described as an example of this invention, duct openings marked "A" communicating with each other through one set of passages, those duct openings marked "B" in FIGURE 2 communicating with each other through another set of passages and those openings marked "C" communicating with each other through a third set of passages, all sets of passages being physically separated by the partition and walls from each other, the passage "A" set being traced through in FIGURE 2 by means of a chain line, showing how a wiring group entering any part of a set of passages in the junction box from any side can be taken out through any of the other sides or through opening 12 when the cover is removed. Moreover, the sloping of the margins 55 both in the narrower and wider passages on the upper side of partition 54 and the sloping of the margins 56 leading to passages beneath the partition 54 both in the wider and narrower passage portions thereon in the respective sets, provide full area openings and sloped surfaces for easy pulling of wires and conductors therethrough with assurance of maximum capacity in the respective passage sets when box 10 is used after installation in its selected place of use.

Figure 13:
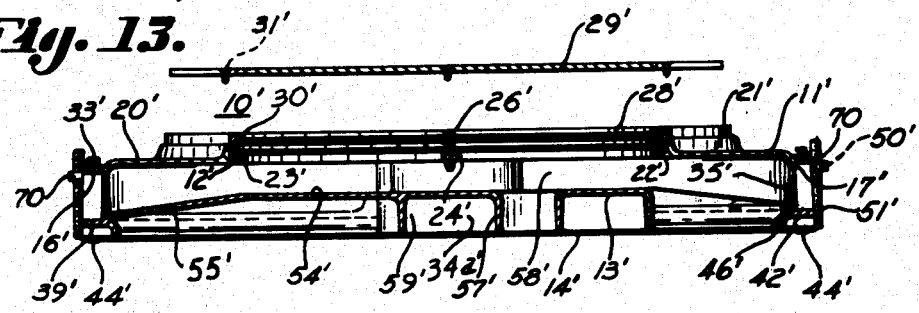
FIGURE 13 is a view in section taken along line XIII—XIII of FIGURE 10.
Figure 14:
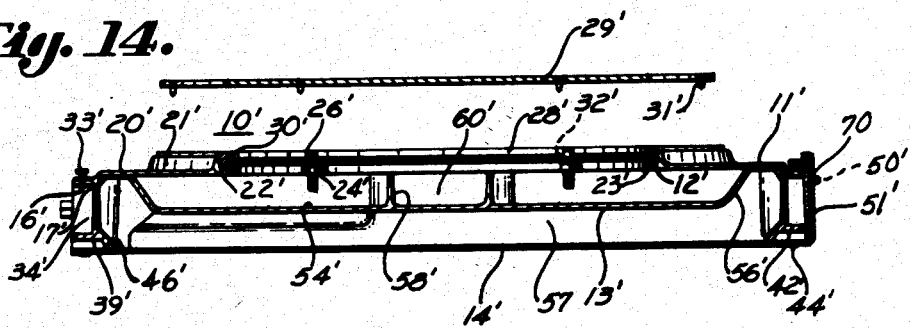
FIGURE 14 is a view in section taken along line XIV—XIV of FIGURE 10.
Figure 15:
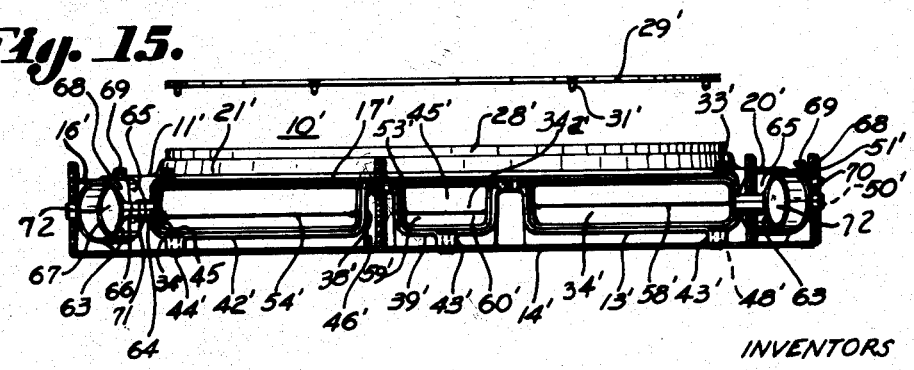
FIGURE 15 is a side view of FIGURE 10 taken in the direction of arrows XV—XV.

Another embodiment of this invention in the form of a three-duct junction box 10' of this invention is illustrated in FIGURES 10 to 15, inclusive. Therein, parts corresponding generally in construction and function to parts in the first above-described embodiment are provided with the same reference numerals with the addition of a prime accent thereto, respectively. Such further embodiment of FIGURES 10 to 15 is provided at its corners having conduit openings therethrough for connection to external circular pipe conduits, or for blanking off with a closure cap if not to be so used. Thus, the corners 19' of partition frame member 13' comprise semicircular collars 63 which are concave upwardly, the collars 63 being an integral part of the rim 39' of casting 13'. Each collar portion has lateral ears 64 to the respective sides thereof. Similarly, the corners 18' of top 11' comprise collar portions 65 with lateral ears 66, the collar portions 65 being concave downwardly. In assembled relation, the respective collars 63 and 65 at each corner form a cylindrical conduit opening 72, the inside of which is provided with respective semicircular beads 67 to serve as an abutment stop for any conduit pipe inserted thereinto. Each collar portion 65 is provided with a lateral boss 68 through which a set screw 69 extends in threaded relation to project, when screwed down into the space defined between the collars to bear against a conduit therein and secure it in fixed position relative to that conduit opening 72 and box 10'. Leveling adjustment for box 10' may be provided by ears 70 having threaded openings for leveling studs 51' to project a selected adjustable height below such ears. In assembled box 10', the respective ears 64 and 66 are provided with registering holes through which rivets 71 are passed and fastened to bind the assembly members 11' and 13' together at the corners.

The total number of openings through the four sides of box 10' is sixteen. One of the conduit openings 72 lead into that compartment which comprises the set of passages B' and is separated from the other sets of passages by an inverted U-shaped tunnel 73 having downwardly extending side walls 74 and a top which is in the plane of partition 54'. The bottom edges of walls 74 extending substantially down to the upper surface of bottom 14', the inner end of tunnel 73 entering and communicating with lower narrower passage 59' through the adjacent wall 57'. Top 11' is provided with a depressed portion 75 to substantially seat against the outer end 76 of the top portion of tunnel 73 so that the interior of such tunnel remains continuous and separated all the way from its respective conduit opening 72. The other conduit outlets are respectively separated in communication with the respective compartments A' and C' formed by the remaining respective sets of passages in box 10'.

Although this invention has been described in terms of three-duct junction boxes, it will be recognized that objects and features of this invention may be incorporated in other plural duct and/or conduit boxes with corresponding change in the compartmentation provided by the partition-frame element. Thus, if there were only one post 38 provided on each side without passages 59 and 60, for example, while retaining one side wall of such passages 59 and 60, the junction box would become a so-called two-duct box embodying this invention without a compartment B therein. And, posts corresponding to posts 18 and 38 may be severally reversed relative to the top and intermediate members, respectively. Various other changes may be made in elements and details of the illustrated embodiments and other embodiments provided without departing from the spirit of this invention or the scope of the appended claims.

We claim:

1. A wiring system junction box or the like having duct openings along its sides, comprising, in combination, a substantially planar metal bottom, a cast intermediate member having a peripheral lower rim adjacent said bottom, a plurality of upstanding posts projecting upwardly from said lower rim, a cast top member having an inner periphery defining an access opening and an outer peripheral upper rim superposed above said lower rim, a plurality of downwardly extending posts projecting from the outer periphery of said top member in laterally spaced relation to said upstanding posts, the spacing between any two successive posts along a side of said box defining the width of a duct opening between said posts respectively, the height of at least said upstanding posts substantially approximating the height of said duct openings respectively, at least one partition and a plurality of walls in said intermediate member to provide passages communicating in separated relation with respective ones of said duct openings, said bottom and members being fastened together at their perimeters.

2. A wiring system junction box or the like as set forth in claim 1, comprising, said bottom being flat sheet metal substantially rectangular in plan, said intermediate and top members being substantially rectangular in plan, said downwardly extending posts being at the corners, said intermediate member further having its lower rim spaced from said bottom between said corners and a skirt extending between said lower rim and said bottom, and fasteners extending at least between the base of said downwardly extending posts and bottom and between the top of said upstanding posts and upper rim, respectively.

3. A wiring system junction box or the like as set forth in claim 2, comprising, a plurality of feet laterally spaced from said corners integral with and extending between the underside of said lower rim and said bottom, the upper surface of said lower rim above said feet being recessed, stop means for the end of a duct in each said duct opening, screw means adapted to secure the end of a duct positioned in a duct opening to said box, said fasteners further connecting said lower rim to said bottom adjacent said feet, the lower end of said fasteners connecting said bottom being substantially flush with the underside of said bottom.

4. A wiring system junction box or the like as set forth in claim 2 in which said lower rim has depressed corners, the underside of said corners adjoining the upper surface of said bottom, said corner posts being truncated in plan and having lower ends which nest in said depressed corners of said intermediate member, said bottom having truncated corners, said fastener at said corners binding together said bottom and said members, said intermediate member having a vertical threaded opening therethrough adapted to receive a stud for the vertical positioning of said box in use.

5. A generally rectangular wiring system junction box or the like having a plurality of duct openings along each side thereof, comprising, in combination, a sheet metal bottom, a cast intermediate member having a rectangular peripheral lower rim adjacent but spaced from the edges of said bottom between corners, closure means extending between said lower rim and said bottom, a plurality of integral upstanding posts projecting upwardly from said lower rim laterally spaced from said corners, a cast top member having an internal periphery defining a circular access opening and a rectangular outer peripheral upper rim superposed above said lower rim, said upper rim resting upon said upstanding posts, an integral upstanding cylindrical flange surrounding said internal periphery and adapted to be outside and adjacent an adjusting ring and cover plate for said circular access opening, a plurality of integral downwardly extending corner posts projecting from the outer periphery of said top member in laterally spaced relation to said upstanding posts, the spacing between any two posts on any side of said box defining the width of a duct opening between said posts respectively, the height of said posts approximately the height of said duct openings between said rims, horizontal partition means having sloping margins and a plurality of walls in said intermediate member to provide upper and lower sets of passages communicating in separated relation with respective ones of said duct openings on more than one side of said box, and rivet means for fastening said bottom and members together along the respective external peripheries thereof.

6. A polygonal wiring system junction box or the like comprising, in combination, a generally planar sheet metal bottom, a cast partition-frame comprising a lower rim substantially around the periphery of said box, said lower rim being raised between its corners above said bottom, said lower rim having at least one upstanding integral inverted U-shaped post along each side of said lower rim intermediate the corners on that side, a cast top comprising an upper rim and an access opening, said upper rim being superposed above said lower rim and resting upon the top of said upstanding posts, said top having downwardly extending corner posts extending to and fitting in said corners of said partition-frame, the spacing between successive posts on each side defining the width of the respective duct openings on that side, said upper and lower rims each substantially being in one plane between corners and comprising the tops and bottoms of said duct openings, said partition-frame having a partition between said top and bottom inwardly of said rims to provide upper and lower passage compartments communicating with more than one duct opening on more than one side of said box, said partition having integral margins and walls, said walls extending upwardly to said top and downwardly to said bottom, said margins being inclined and extending toward a lower rim portion of a duct opening in the case of an upper passage and toward an upper rim portion of a duct opening in the case of a lower passage to provide substantially full area openings to respective passages in the interior of said box, and means for affixing said bottom partition-frame and top to one another around the periphery of said box.

7. A polygonal wiring system junction box or the like as set forth in claim 6, comprising, closure means for said U-shaped posts and the spce between said lower rim and said bottom, laterally spaced feet integral with the underside of said lower rim extending to said bottom to distribute stress thereover, and means for adhesively affixing lower edges of said downwardly extending walls to said bottom inwardly of the periphery of said box.

8. A polygonal wiring system junction box or the like, comprising, in combination, a planar sheet metal bottom, a cast partition-frame comprising a lower rim around the periphery of said box, a cast top comprising an upper rim around the periphery of said box and an access opening inwardly of said upper rim, said upper rim being superposed above said lower rim, at least one of said rims having integral posts extending to the other rim between the respective corners of said box, means for fastening said bottom, partition-frame and top together with substantially non-projecting fasteners around the periphery of said box at least some corners of said box comprising conduit openings, said conduit openings each having an arcuate concave downwardly conduit collar portion integral with said upper rim and an arcuate concave upwardly conduit collar portion integral with said lower rim, said conduit collar portions of each conduit opening acting as posts, duct openings along each side of said box being defined by the spaces between posts and upper and lower rim portions respectively extending between said posts.

9. A wiring system generally polygonal junction box or the like having a plurality of duct openings along each side thereof, comprising, in combination, a sheet metal bottom, a cast metal intermediate member to partition the interior of said box and having a polygonal peripheral lower rim adjacent said bottom, at least one upstanding post projecting upwardly along each side of said lower rim laterally spaced from the corners of said box, a cast metal top member having an access opening therein and a polygonal peripheral upper rim superposed above said lower rim, said upper rim resting upon said upstanding posts, a plurality of integral downwardly extending corner members projecting from said upper rim at least adjacent said corners in laterally spaced relation to said upstanding posts respectively, and means for fastening said members and bottom together around the periphery of said box.

References Cited by the Examiner
UNITED STATES PATENTS

| | | | |
|---|---|---|---|
| 2,936,091 | 5/60 | Clark | 220—3.4 |
| 3,013,690 | 12/61 | Johnson et al. | 220—3.4 |
| 3,061,663 | 10/62 | Rieland | 174—49 |

FOREIGN PATENTS

| | | |
|---|---|---|
| 591,775 | 2/60 | Canada |

JOHN F. BURNS, *Primary Examiner.*

JOHN P. WILDMAN, *Examiner.*